United States Patent
Nakamura et al.

(10) Patent No.: US 9,944,160 B2
(45) Date of Patent: Apr. 17, 2018

(54) VEHICLE FLOOR STRUCTURE

(71) Applicant: TOYOTA JIDOSHA KABUSHIKI KAISHA, Toyota-shi, Aichi-ken (JP)

(72) Inventors: Kentaro Nakamura, Toyota (JP); Toshihiro Goto, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/296,593

(22) Filed: Oct. 18, 2016

(65) Prior Publication Data

US 2017/0158039 A1   Jun. 8, 2017

(30) Foreign Application Priority Data

Dec. 7, 2015   (JP) .................. 2015-238518

(51) Int. Cl.
*B62D 25/20*   (2006.01)
*B62D 21/02*   (2006.01)
*B62D 29/04*   (2006.01)
*B62D 21/03*   (2006.01)
*B60K 1/04*   (2006.01)
*B62D 29/00*   (2006.01)

(52) U.S. Cl.
CPC ............ *B60K 1/04* (2013.01); *B62D 25/20* (2013.01); *B62D 25/2009* (2013.01); *B62D 29/005* (2013.01); *B60K 2001/0438* (2013.01)

(58) Field of Classification Search
CPC  B62D 25/20; B62D 25/2009; B62D 25/2018; B62D 25/2027; B62D 25/2036; B62D 35/02
See application file for complete search history.

(56) References Cited

U.S. PATENT DOCUMENTS

| | | | |
|---|---|---|---|
| 7,287,797 | B1 | 10/2007 | Belloso |
| 2009/0152034 | A1 | 6/2009 | Takasaki et al. |
| 2012/0153673 | A1* | 6/2012 | De Luca ............. B62D 25/087 296/193.04 |
| 2013/0257103 | A1* | 10/2013 | Mildner ............. B62D 25/20 296/193.07 |
| 2015/0251700 | A1 | 9/2015 | Choi et al. |

FOREIGN PATENT DOCUMENTS

| | | |
|---|---|---|
| JP | S64-022681 A | 1/1989 |
| JP | 2007-126064 A | 5/2007 |
| JP | 2008-068720 A | 3/2008 |
| JP | 2009-143446 A | 7/2009 |
| JP | 4788539 B2 | 10/2011 |
| JP | 2015-047895 A | 3/2015 |
| JP | 2015-168420 A | 9/2015 |
| WO | 2013/153872 A1 | 10/2013 |

* cited by examiner

*Primary Examiner* — Bryan A Evans
(74) *Attorney, Agent, or Firm* — Oliff PLC (57) ABSTRACT

A vehicle floor structure comprises a floor panel made from fiber reinforced resin; a pair of framework members made of metal, the pair of framework members extend in a vehicle front-rear direction with the floor panel interposed at vehicle width direction inner sides of the pair of framework members, and both end portions in a vehicle width direction of the floor panel are joined to the pair of framework members; and a cross member made of metal, and the cross member extends in the vehicle width direction, both end portions in the vehicle width direction of the cross member are joined to the pair of framework members.

7 Claims, 5 Drawing Sheets

VEHICLE FLOOR STRUCTURE

CROSS-REFERENCE TO RELATED APPLICATION

This application claims priority under 35 USC 119 from Japanese Patent Application No. 2015-238518 filed Dec. 7, 2015, the disclosure of which is incorporated by reference herein in its entirety.

BACKGROUND

Technical Field

Preferred embodiments relate to a vehicle floor structure.

Related Art

Cabins made from Carbon Fiber Reinforced Plastics (CFRP) are known in which a vehicle cabin, that includes at least a floor panel section, left and right side sills, and a dash panel section connecting respective front portions of the left and right side sills and a front portion of the floor panel together, is constructed from CFRP (for example, see International Publication (WO) No. 2013/153872). In such a configuration, a vehicle width direction dimension of each of the front ends of the side sills is widen on progression toward a front side frame so as to be wider than the vehicle width direction dimension of the front wheels. This dimensional arrangement is made in order to prevent brittle fracture of the front ends of the side sills which may be caused by out-of-plane deformation of the front ends to which load is input from the front wheels during a frontal collision.

SUMMARY

As described above, CFRP, this being a fiber reinforced resin, is a brittle material. Thus, there is room for improvement from the perspective of collision countermeasures.

In consideration of the above circumstances, an object of preferred embodiments is to provide a vehicle floor structure with a configuration employing a floor panel made of fiber reinforced resin in which deformation due to a collision is reduced or prevented compared to a configuration in which main portions are formed overall from fiber reinforced resin.

The vehicle floor structure of a first aspect includes a floor panel made from fiber reinforced resin, a pair of framework members that are made of metal, and a cross member that is made of metal. The pair of framework members extends in a vehicle front-rear direction with the floor panel interposed at vehicle width direction inner sides of the pair of framework members, and both end portions in the vehicle width direction of the floor panel are joined to the pair of framework members. The cross member extends in the vehicle width direction, and both end portions in the vehicle width direction of the cross member are joined to the pair of framework members.

In this vehicle floor structure, the pair of framework members that extend to the front and rear at the vehicle width direction outer sides, and the cross members that connect the pair of framework members, are respectively configured by a metal, this being a ductile material. Thus, overall deformation of the vehicle floor structure is reduced or prevented, even were the floor panel, this being made of a brittle material, to break in a vehicle collision.

In this manner, deformation due to a collision is reduced or prevented in the vehicle floor structure of the first aspect compared to in a configuration in which main portions of the vehicle floor structure are formed overall by a fiber reinforced resin.

The vehicle floor structure of a second aspect is the configuration of the first aspect, and furthermore, the cross member is configured to be fixed to at least a part of fixing portion of a vehicle seat to a vehicle body.

In this vehicle floor structure, the cross member is fixed to at least a part of the fixing portion of the vehicle seat to the vehicle body, and so the vehicle seat is accordingly prevented from coming away from the cross member, namely, from the vehicle body, even were the floor panel to break in a vehicle collision.

The vehicle floor structure of a third aspect is the configuration of the second aspect, further includes a battery pack, and at least one of plural fixing portions that fix the battery pack to the vehicle body is fixed to the cross member.

In this vehicle floor structure, part of the load from the vehicle seat is dispersed to the battery pack that is fixed at plural locations to the vehicle body, including the cross member. Thus, load input from the vehicle seat to the cross member and the like during a collision is reduced. This enable a reduction in weight, such as by reducing the size of the cross members or the like.

The vehicle floor structure of the fourth aspect is the configuration of any one of the first aspect to the third aspect, and furthermore, the cross member is continuous in the vehicle width direction.

In this vehicle floor structure, a state is maintained in which the left and right rockers are connected by the respective cross member, even were the floor panel to break during a collision.

The vehicle floor structure of the fifth aspect is the configuration of any one of the first aspect to the fourth aspect, and furthermore, at least one of plural end portions in the vehicle front-rear direction of the floor panel is joined to the cross member.

In this vehicle floor structure, overall deformation of the vehicle floor structure due to a collision is reduced or prevented compared to a configuration in which main portions are made overall of fiber reinforced resin.

The vehicle floor structure according to the present disclosure as explained above exhibits the excellent advantageous effect of reducing or preventing deformation of the vehicle floor structure due to a collision compared to a configuration in which main portions of the vehicle floor structure are made overall of fiber reinforced resin.

BRIEF DESCRIPTION OF THE DRAWINGS

Preferred embodiments will be described in detail based on the following figures, wherein.

DETAILED DESCRIPTION

Explanation follows regarding a vehicle floor structure 10 according to an exemplary embodiment, with reference to FIG. 1 to FIG. 4. Note that in each of the drawings, the arrow FR indicates the front direction in the vehicle front-rear direction, the arrow UP indicates the upper direction in the vehicle up-down direction, and the arrow W indicates the vehicle width direction, as appropriate. In the following explanation, unless specifically state otherwise, reference to the front-rear and up-down directions indicate front-rear in the vehicle front-rear direction and up-down in the vehicle up-down direction.

Figure 1:
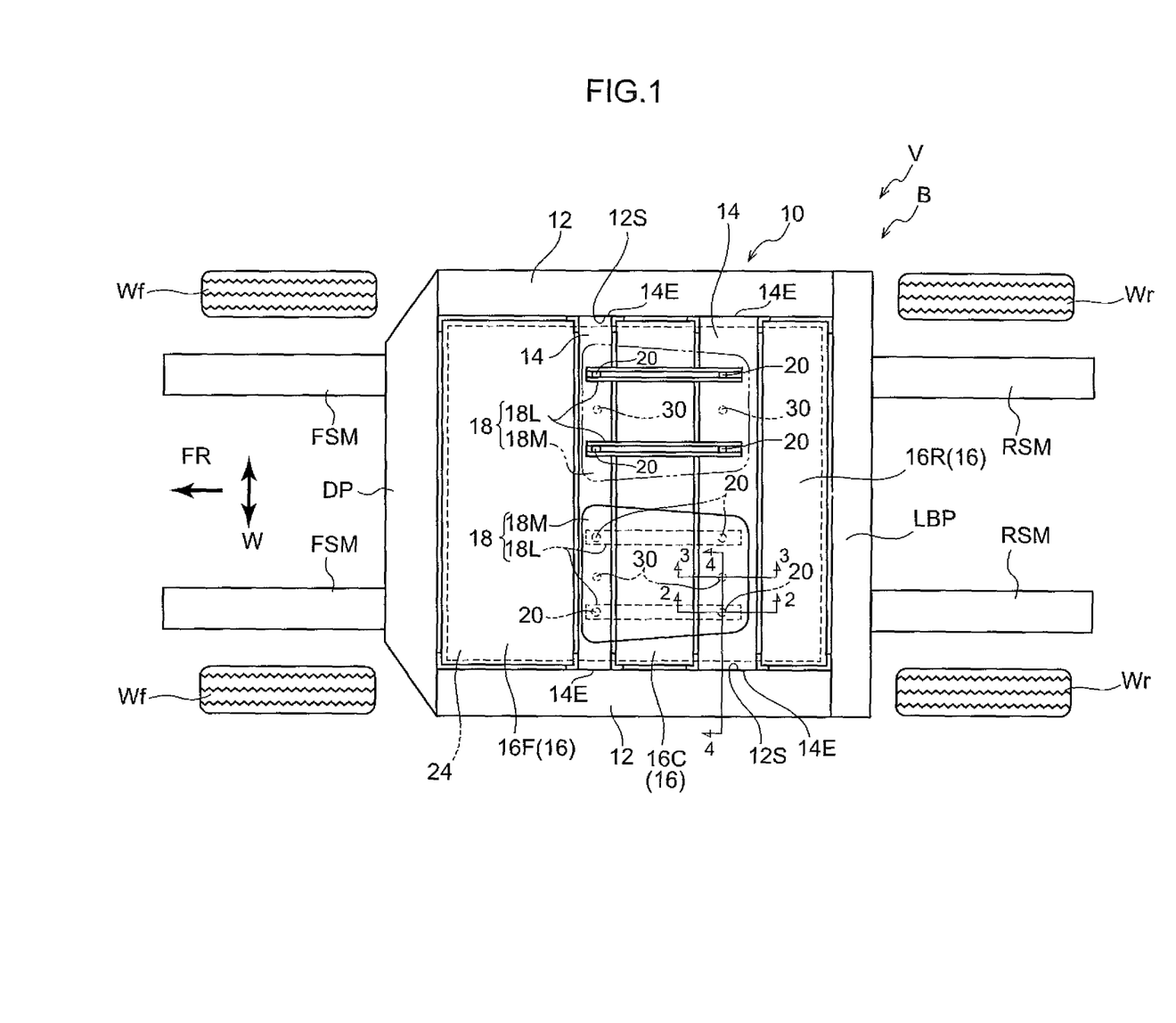
FIG. 1 is a schematic plan view illustrating an outline of configuration of a vehicle applied with a vehicle floor structure according to an exemplary embodiment.

FIG. 1 illustrates in outline plan view showing a schematic configuration of an automobile V, serving as a vehicle applied with the vehicle floor structure 10. As illustrated in FIG. 1, the vehicle floor structure 10 is disposed in the automobile V in the vehicle front-rear direction between respective left and right pairs of front wheels Wf and rear wheels Wr.

A pair of left and right front side members FSM are disposed between the left and right front wheels Wf, and rear ends of the front side members FSM are connected to a front end of the vehicle floor structure 10 through a dash panel DP. A pair of left and right rear side members RSM are disposed between the left and right rear wheels Wr, and front ends of the rear side members are connected to a rear end of the vehicle floor structure 10 through a lower back panel LBP.

The front side members FSM, the rear side members RSM, the dash panel DP, and the lower back panel LBP configure, together with the vehicle floor structure 10, main portions of a vehicle body B.

The vehicle floor structure 10 includes a pair of rockers 12 that respectively extend along the vehicle front-rear direction and configure framework at both outer sides in the vehicle width direction of the vehicle body B. The vehicle floor structure 10 also includes cross members 14 that extend in the vehicle width direction, and the two end portions in the vehicle width direction of each of the cross members 14 are respectively joined to a different rocker 12. The vehicle floor structure 10 of the present exemplary embodiment includes two of the cross members 14 separated from each other in the front-rear direction. The vehicle floor structure 10 also includes a floor panel 16 that is joined to the pair of rockers 12 and the cross members 14.

Figure 4:
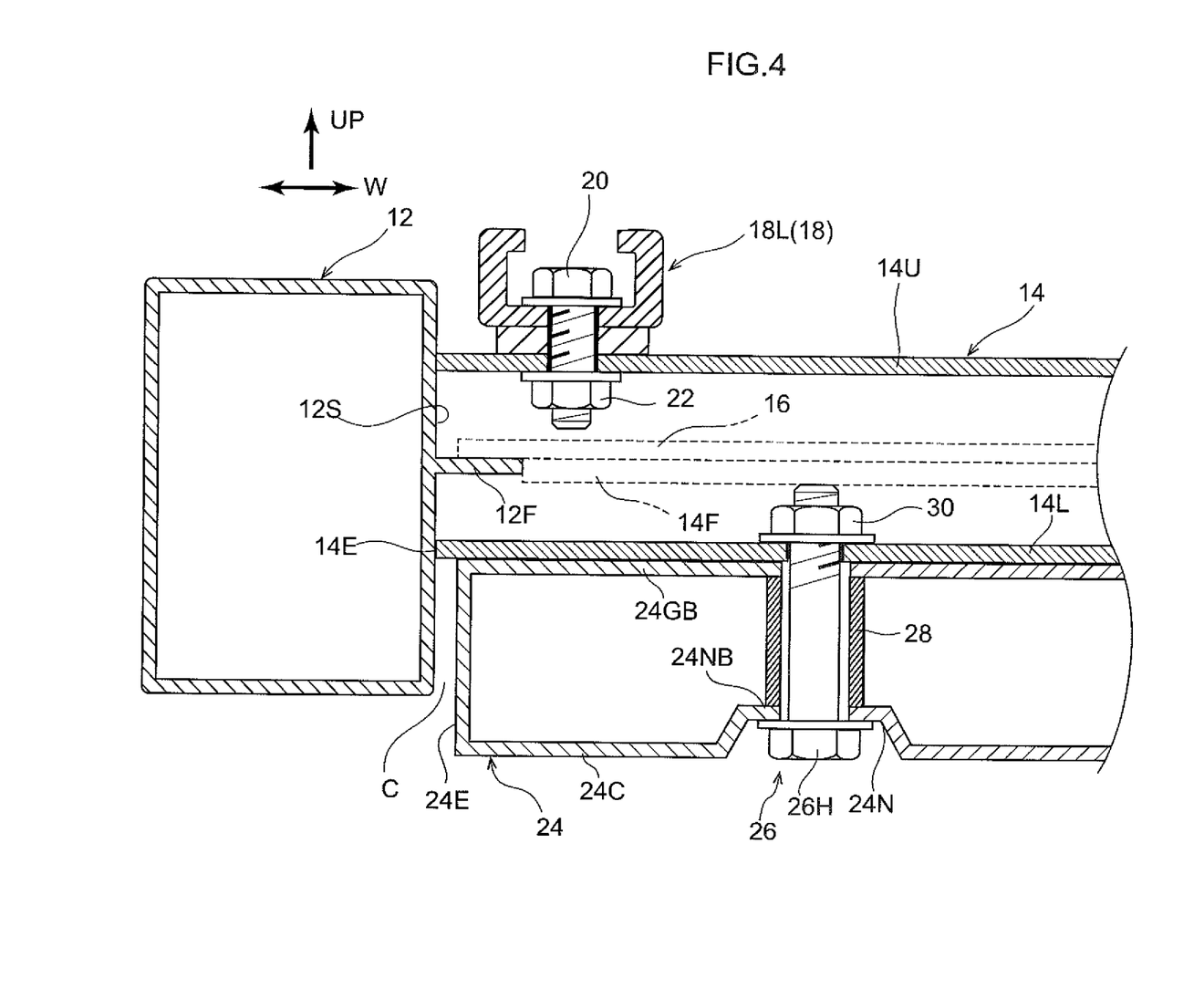
FIG. 4 is a cross-section sectioned along line 4-4 in FIG. 1.

Each rocker 12 is made from a metal, this being a ductile material. In the present exemplary embodiment, the metal configuring each rocker 12 is aluminum or aluminum alloy. Each rocker 12 has a chamber structure forming a rectangular frame shape in cross-section taken at right angles to the length direction of the rocker 12, as illustrated in FIG. 4. As illustrated in FIG. 4, a flange 12F projects out toward the vehicle width direction inner side, from an up-down direction intermediate portion of an inside wall 12S configuring the vehicle width direction inner side of each rocker 12. In the present exemplary embodiment, each rocker 12 is configured by an extrusion formed component of aluminum or an aluminum alloy having the same shape from a front end to a rear end in cross-section taken at right angles to its length direction.

Figure 2:
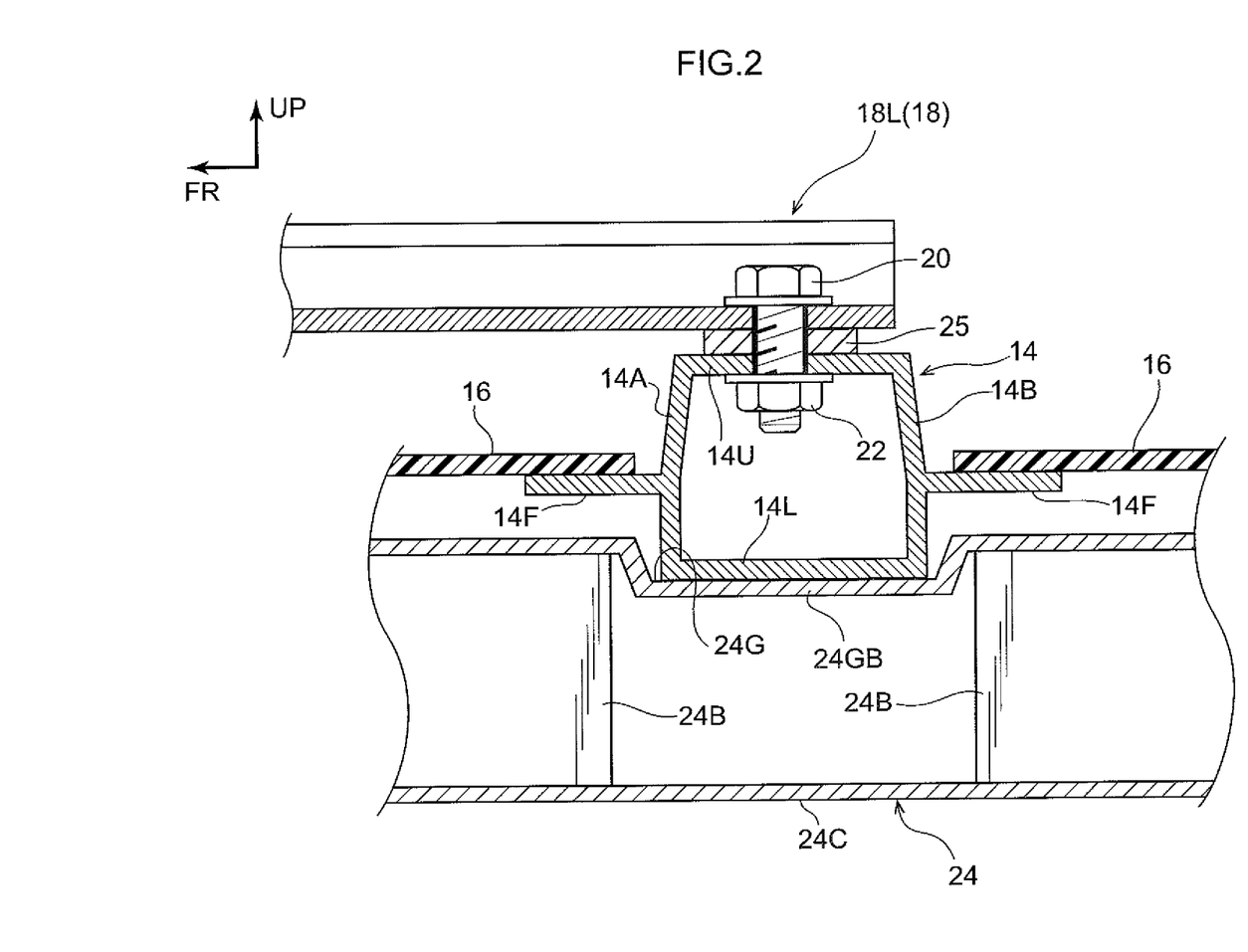
FIG. 2 is a cross-section sectioned along line 2-2 in FIG. 1.
Figure 3:
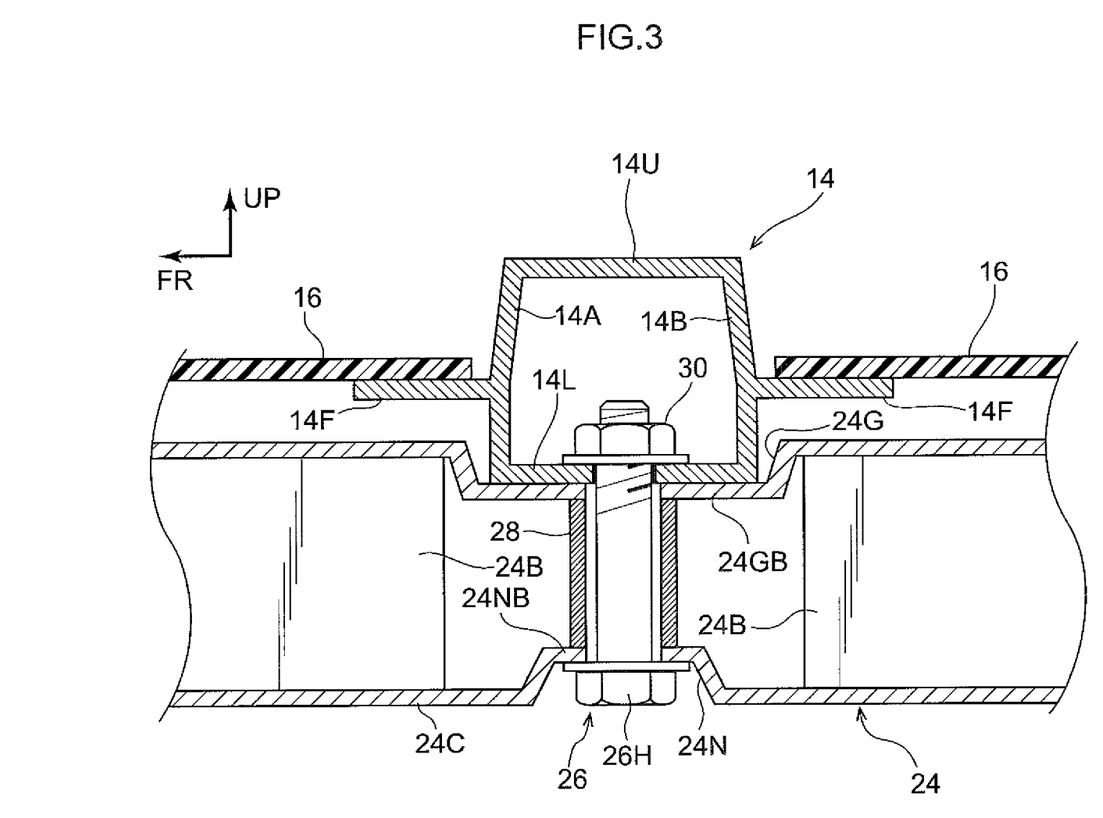
FIG. 3 is a cross-section sectioned along line 3-3 in FIG. 1.

Each of the cross members 14 is made from a metal, this being a ductile material. In the present exemplary embodiment, the metal configuring each of the cross members 14 is aluminum or aluminum alloy. Each of the cross members 14 has a chamber structure forming a rectangular frame shape in cross-section taken at right angles to the length direction of the cross member 14, as illustrated in FIG. 2 and FIG. 3. A right end of each of the cross members 14 is joined to the rocker 12 on the right side, and a left end of each of the cross members 14 is joined to the rocker 12 on the left side, such that each of the cross members 14 spans a region between the left and right rockers 12. Each of the cross members 14 has no interruption partway along the vehicle width direction and has no other member interposed between the left and right rockers 12.

Moreover, a flange 14F projects out toward the front from an up-down direction intermediate portion of a front wall 14A configuring each of the cross members 14, and a flange 14F projects out toward the rear from an up-down direction intermediate portion of a rear wall 14B configuring each of the cross members 14. In the present exemplary embodiment, each of the cross members 14 is configured by an extrusion formed component of aluminum or aluminum alloy having the same shape from a left end to a right end in cross-section taken at right angles to the length direction.

As illustrated in FIG. 4, the height (the up-down direction position) of an upper face of the flange 12F of each rocker 12, and of an upper face of the flange 14F of each of the cross members 14, are aligned with each other. Vehicle width direction end portions 14E of the cross members 14 are joined to the inside walls 12S of the rockers 12 by a joining structure such as welding in a state in which the end portions 14E abut the inside walls 12S.

The floor panel 16 is configured by fiber reinforced resin. In the present exemplary embodiment, the fiber reinforced resin configuring the floor panel 16 is made from carbon fiber reinforced plastics (hereafter referred to as "CFRP"). The floor panel 16 of the present exemplary embodiment is formed in a flat plate shape, and, as illustrated in FIG. 1, is divided in the front and back direction, with each of the cross members 14 acting as a boundary. In other words, the floor panel 16 is divided in the front and back direction into three. When in the following explanation, the floor panel 16 is distinguished into each floor panel, the floor panel 16 is respectively referred to as floor panels 16F, 16C, 16R, in this order from the front side.

The floor panels 16F, 16C, 16R are respectively joined to the rockers 12 and the cross members 14. In the present exemplary embodiment, the floor panels 16 are joined by bonding or the like to the each of the flanges 12F, 14F of the rockers 12 and the cross members 14 (see FIG. 2 to FIG. 4).

More specifically, the left and right edge portions of the floor panel 16F positioned at the front side are joined to the flanges 12F of the respective rockers 12, and a rear edge portion of the floor panel 16F is joined to the front flange 14F of the front side cross member 14. A front edge portion of the floor panel 16F may be joined to the dash panel DP.

The left and right edge portions of the floor panel 16C positioned in the front-rear direction intermediate position are joined to the flanges 12F of the respective rockers 12. Moreover, a front edge portion of the floor panel 16C is joined to the rear side flange 14F of the front side cross member 14, and a rear edge portion of the floor panel 16C is joined to the front side flange 14F of the rear side cross member 14.

The left and right edge portions of the floor panel 16R positioned at the rearmost side are joined to the flanges 12F of the respective rockers 12, and a front edge portion of the floor panel 16R is joined to a rear side flange 14F of the rear side cross member 14. A rear edge portion of the floor panel 16R may be joined to the lower back panel LBP.

As described above, in the vehicle floor structure 10, the metal rockers 12 extend in the vehicle front-rear direction with the floor panel 16 interposed in the vehicle width direction between the rockers 12 such that the rockers 12 construct a pair of framework members to which the respective vehicle width direction end portions of the floor panel 16 are joined.

In the vehicle floor structure 10, at least a part of a fixing portion of a vehicle seat 18 to the vehicle body B is fixed to the cross member 14. Main portions of the vehicle seat 18 are configured by lower rails 18L and a seat main body 18M. The lower rails 18L are fixing members for fixing to the vehicle body, and an occupant sits on the seat main body 18M. Note that FIG. 1 illustrates a vehicle seat 18 on the right side, with the seat main body 18M indicated by dashed lines, and the lower rails 18L indicated by solid lines.

In the present exemplary embodiment, a pair of left and right lower rails 18L is provided to each vehicle seat 18, and the front and rear end portions of the lower rails 18L respectively configure fixing portions to the vehicle body B. Namely, a single vehicle seat 18 is provided with a total of four fixing portions to the vehicle body. Respective rear end portions of the left and right pair of lower rails 18L are fixed to the rear side cross member 14, and respective front end portions thereof are fixed to the front side cross member 14. Namely, in the present exemplary embodiment, all of the fixing portions of the vehicle seat 18 to the vehicle body B are fixed to the cross members 14. In other words, two fixing portions, these being a part of the four fixing portions of the vehicle seat 18, are fixed to the rear side cross member 14, and two fixing portions, these being a remaining part of the four fixing portions of the vehicle seat 18, are fixed to the front side cross member 14.

Moreover, the lower rails 18L configuring the vehicle seat 18 are fixed by fastening to each of the cross members 14. More specifically, as illustrated in FIG. 2 and FIG. 4, the front and rear end portions of the lower rails 18L are joined to the cross members 14 by bolts 20 that each penetrate, from the upper side, through the respective lower rail 18L, a spacer 25, and an upper wall 14U of the cross member 14, and thread into a nut 22. Although not illustrated in the drawings, upper rails fixed to the seat main body 18M are attached so as to slide on the lower rails 18L and be capable of locking at a freely selected front-rear position.

Although not illustrated in the drawings, a three-point or four-point seat belt device (an anchor and a retractor) is incorporated in the vehicle seat 18. Thus, the vehicle seat 18 of the present exemplary embodiment supports load arising from the seat belt restraining the occupant during a collision. More specifically, the load is transmitted to the vehicle body B through the lower rails 18L.

Moreover, in the vehicle floor structure 10, a battery pack 24 is fixed to the cross members 14 at plural locations in the vehicle width direction. The battery pack 24 is a storage battery cell that stores electrical power for supply to a motor that drives the automobile V, and is disposed below the floor panel 16. The battery pack 24 is formed in a rectangular shape in plan view so as to occupy most of the space between the left and right rockers 12. In other words, the battery pack 24 is formed in a rectangular shape enclosed by the left and right rockers 12, the dash panel DP, and the lower back panel LBP.

As illustrated in FIG. 2 to FIG. 4, the battery pack 24 is configured by plural batteries 24B housed inside a battery case 24C. The battery case 24C is made of a metal, this being a ductile material. In the present exemplary embodiment, the metal configuring the battery case 24C is aluminum or an aluminum alloy.

As illustrated in FIG. 2 and FIG. 3, grooves 24G are formed in an upper portion of the battery case 24C, with lower portions of the cross members 14 entering into the grooves 24G. The batteries 24B are not disposed at the locations formed with the grooves 24G. The battery pack 24 is fixed by fastening to the cross members 14 in a state in which respective lower walls 14L of the cross members 14 are in contact with a groove bottom 24GB of each groove 24G. Note that in this fixed state there are gaps formed between an upper face of the battery case 24C and a lower face of the floor panel 16.

As illustrated in FIG. 3 and FIG. 4, recesses 24N are formed at lower portions of the portions of the battery case 24C where the grooves 24G are formed, and head portions 26H of bolts 26 enter into the recesses 24N. In the battery case 24C, circular tube shaped collars 28 are disposed between the groove bottoms 24GB and the recess bottoms 24NB of the recesses 24N. The collars 28 may be integrally formed to the battery case 24C, or may be configured as separate members to the battery case 24C.

The battery pack 24 is joined to the cross members 14 by the bolts 26 that each penetrate, from the lower side, through the recess bottoms 24NB, the collars 28, and the groove bottom 24GB, and thread into a nut 30. As illustrated in FIG. 1, in the present exemplary embodiment, the fixing locations of the battery pack 24 to each of the cross members 14 are respectively set between the fixing locations of the pair of lower rails 18L of each vehicle seat 18 to the cross members 14.

There are accordingly a total of four fixing portions to the vehicle body for the battery pack 24. In the present exemplary embodiment, all of the fixing portions of the battery pack 24 are fixed to the cross members 14. That is to say, there are two fixing portions, within the four fixing portions, separated from each other in the vehicle width direction, and fixed to the rear side cross member 14. And there are two fixing portions, within the four fixing portions, separated from each other in the vehicle width direction, and fixed to the front side cross member 14. In this fixed state, vehicle width direction outer ends 24E of the battery pack 24 face the inside walls 12S of the rockers 12, with a gap C maintained between the battery pack 24 and the rockers 12. In the present exemplary embodiment, vehicle width direction outer ends 24E of the battery pack 24 are positioned further to the outer side in the vehicle width direction than the lower rails 18L on the vehicle width direction outer side.

The vehicle floor structure 10 is configured as described above. The vehicle floor structure 10 is not provided with a floor tunnel, and not provided with framework members (reinforcement members) extending in the front-rear direction along a tunnel opening. Moreover, the vehicle floor structure 10 is not provided with framework members (reinforcement members) extending in the front-rear direction between the rockers 12. Thus, as described above, each of the cross members 14 spans between the left and right rockers 12 without any interruption partway along the vehicle width direction and without being divided by any other member interposed. The vehicle floor structure 10 is configured in this manner including, as main structural members, the pair of rockers 12, the cross members 14 disposed at the front and rear positions, and the floor panel 16. The battery pack 24 (the battery case 24C) may also be defined as being a main structural member configuring the vehicle floor structure 10.

Operation

Explanation follows regarding operation of the exemplary embodiment.

In the vehicle floor structure 10, the floor panel 16 is configured from CFRP, and so a weight reduction in the vehicle body B, namely, in the automobile V, is achieved compared to a configuration in which a floor panel is made of steel.

However, in a comparative example in which main portions, including the framework structure of a vehicle floor structure of an automobile V, are configured from CFRP in order to achieve a reduction in weight, if configuration components made of CFRP were to break during a collision involving the automobile V, then there would be a concern that a large amount of deformation might occur in a cabin. If reinforcement or energy absorption members were added as a counter-measure thereto, then the weight reduction by using CFRP would decrease, and the number of components would increase.

By contrast thereto, in the vehicle floor structure 10 according to the present exemplary embodiment, the pair of rockers 12, and the cross members 14 connecting the pair of rockers 12, are configured by a metal, which is a ductile material. Thus, breaking of the rockers 12 and cross members 14, which configure main framework, during a collision involving the automobile V is prevented or effectively reduced. Namely, deformation of the cabin during a collision can be reduced compared to in the comparative example described above, without relying on the addition of reinforcement or energy absorption members, or the like. To explain further, even if the floor panel 16 configured by a brittle material were to break during a collision, a state in which the left and right rockers 12 are connected by the cross members 14 would be maintained, due to the pair of rockers 12 being linked by the metal cross members 14 which are continuous and without any interruption in the vehicle width direction. Thus, as explained above, the left and right rockers 12 approaching each other, namely, deformation of the cabin, as a result of the floor panel 16 breaking during a collision is prevented compared to the comparative example described above.

In the vehicle floor structure 10, at least a part of the lower rails 18L configuring the vehicle seat 18 is fixed to the cross members 14. Thus, even if the floor panel 16 were to break during a collision involving the automobile V, the vehicle seat 18 would be suppressed from coming away from the vehicle body B.

Moreover, in the vehicle floor structure 10, at least a part of the plural fixing portions of the battery pack 24 to the vehicle body B is fixed to the cross members 14. Thus, for example, load arising from a seatbelt device restraining an occupant during a frontal collision is transmitted from the vehicle seat 18 to the cross members 14, and part of the load is dispersed to the battery pack 24 that is fixed to the cross members 14. Load input from the vehicle seat to the cross members and the like during a collision is thereby reduced compared, for example, to a configuration not provided with the battery pack 24. The burden at the floor panel 16 at positions in the vicinity of the fastening locations of the lower rails 18L, that are portions where load from the vehicle seat 18 is input, on the cross members 14 is thereby reduced.

Accordingly, compared to a configuration not provided with the battery pack 24, the present vehicle floor structure 10 enables a weight reduction to be achieved by reducing the size of the cross members 14 (using smaller cross-sections), or by adopting a thinned or perforated structure for the cross members 14.

Modified Example

Figure 5:
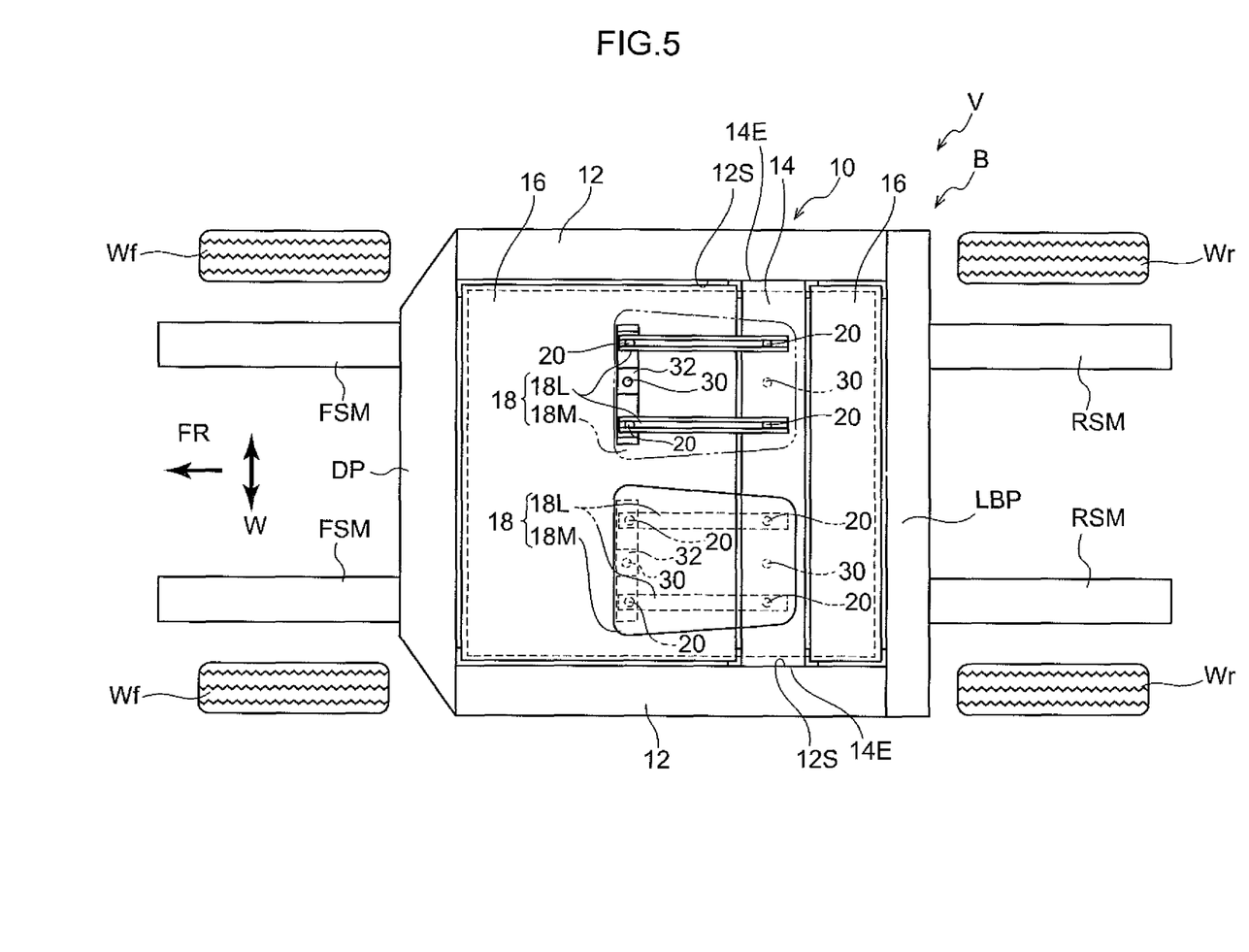
FIG. 5 is a schematic plan view illustrating an outline of configuration of a vehicle applied with a vehicle floor structure according to a modified example of an exemplary embodiment.

In the exemplary embodiment described above, the vehicle floor structure 10 includes two of the metal cross members 14 separated from each other in the front-rear direction; however, the present disclosure is not limited thereto. For example, as illustrated in FIG. 5, the vehicle floor structure 10 may be configured including only one cross member 14. In the example in FIG. 5, the rear side end portions of the lower rails 18L are fixed by fastening to the cross member 14, and the front side end portions of the lower rails 18L are fixed to the floor panel 16 via brackets 32. In the example illustrated in FIG. 5, the two front side fixing portions out of the four fixing portions of the battery pack 24 to the vehicle body B, are fixed to a floor panel 16 via the brackets 32. In the modified example too, basically similar advantageous effects to those of the above exemplary embodiment can also be obtained.

Note that, in the exemplary embodiment and in the modified example above, there are four fixing portions for each vehicle seat 18 to the vehicle body B; however, the present disclosure is not limited thereto. The vehicle seat 18 may have three or fewer, or five or more, fixing portions to the vehicle body B. Similarly, the battery pack 24 has four fixing portions to the vehicle body B; however, the present disclosure is not limited thereto. There is no restriction to the number of fixing portions of the battery pack 24 to the vehicle body B, as long as there are plural fixing portions. It is sufficient as long as the exemplary embodiments are configured including the floor panel 16 made from fiber reinforced resin, the pair of rockers 12 made from metal, and at least one of the cross members 14 made from metal. Accordingly, the present disclosure is not limited to configuration in which at least a part of the fixing portions of the vehicle seat 18 to the vehicle body B, and at least a part of the fixing portions of the battery pack 24 to the vehicle body B, are fixed to the cross members 14.

In the exemplary embodiment above, the rockers 12 and the cross members 14 are joined by welding, and the floor panel 16 are joined by bonding to the rockers 12 and the cross members 14; however, the present disclosure is not limited thereto. For example, the joints between the rockers 12 and the cross members 14, and the joints between the floor panel 16 with respect to the rockers 12 and the cross members 14, may employ another joining structure, such as riveting. Similarly, in the exemplary embodiment above, the lower rails 18L and the battery pack 24 are fixed to the cross members 14 by fastening; however, the present disclosure is not limited thereto. For example, another fixing structure such as riveting or welding may be employed for fixing at least one out of the lower rails 18L or the battery pack 24 to the cross members 14.

Moreover, in the exemplary embodiment above, the rockers 12 and the cross members 14 are made of aluminum or an aluminum alloy; however, the present disclosure is not limited thereto. For example, configuration may be made in which at least one out of the rockers 12 or the cross members 14 is made of a metal material (for example, steel) differing to that of the above. In such cases, the rockers 12 and the cross members 14 may be configured by metal materials that are the same (material), or may be configured by metal materials that are different to each other.

Moreover, in the exemplary embodiment above, the metal rockers 12 and cross members 14 form independent hollow structures; however, the present disclosure is not limited thereto. For example, at least one out of the rockers 12 or the cross members 14 may be configured by an open structure in cross-section, or may be configured by joining plural metal members together to form a hollow structure. For example, at least one out of the rockers 12 or the cross members 14 may be formed with a hollow structure of a metal member together with a member of another material, such as the floor panel 16.

Moreover, in the exemplary embodiment above, the floor panel 16 is configured from CFRP; however, the present disclosure is not limited thereto. For example, resin reinforced by glass fibers or Kevlar fibers is employed serving as the fiber reinforced plastic (FRP) configuring the floor panel 16.

Moreover, in the exemplary embodiment above, the automobile V in which the vehicle floor structure 10 is applied includes two vehicle seats 18 disposed in side-by-side in the vehicle width direction; however, the present disclosure is not limited thereto. For example, the automobile V may be configured including a single vehicle seat 18 at the vehicle width direction center.

Obviously, various other modifications may be implemented within a range not departing from the scope of the present claims. For example, configuration may be made with a reinforcement structure that combines any of the elements of the modified examples above as appropriate.

What is claimed is:

1. A vehicle floor structure, comprising:
   a floor panel made from fiber reinforced resin;
   a pair of framework members made of metal, extending in a vehicle front-rear direction with the floor panel interposed at vehicle width direction inner sides of the pair of framework members, and both end portions in a vehicle width direction of the floor panel being joined to the pair of framework members; and
   a cross member made of metal, and extending in the vehicle width direction, both end portions in the vehicle width direction of the cross member being joined to the pair of framework members,
   wherein the cross member has a chamber structure with a hollow cross-section having a closed shape.

2. The vehicle floor structure of claim 1, wherein the cross member is configured to be fixed to at least a part of a fixing portion of a vehicle seat to a vehicle body.

3. The vehicle floor structure of claim 2, further comprising a battery pack, wherein at least one of a plurality of fixing portions that fix the battery pack to the vehicle body is fixed to the cross member.

4. The vehicle floor structure of claim 1, wherein the cross member is continuous in the vehicle width direction.

5. The vehicle floor structure of claim 1, wherein at least one of a plurality of end portions in the vehicle front-rear direction of the floor panel is joined to the cross member.

6. The vehicle floor structure of claim 1, wherein the entire floor panel is located at a lower side than an upper wall of the cross member.

7. The vehicle floor structure of claim 1, wherein:
   a front side flange projects out toward a front in the vehicle front-rear direction from an up-down direction intermediate portion of a front wall of the cross member,
   a rear side flange projects out toward a rear in the vehicle front-rear direction from an up-down direction intermediate portion of a rear wall of the cross member, and
   a front edge portion of the floor panel is joined to the rear side flange of the cross member, or a rear edge portion of the floor panel is joined to the front side flange of the cross member.

* * * * *